United States Patent
Burke, Jr.

[11] Patent Number: 5,924,283
[45] Date of Patent: Jul. 20, 1999

[54] ENERGY MANAGEMENT AND SUPPLY SYSTEM AND METHOD

[75] Inventor: Thomas F. Burke, Jr., Short Hills, N.J.

[73] Assignee: Enmass, Inc., Morristown, N.J.

[21] Appl. No.: 08/906,651

[22] Filed: Aug. 7, 1997

Related U.S. Application Data

[63] Continuation of application No. 08/699,687, Aug. 14, 1996, which is a continuation of application No. 08/482,694, Jun. 7, 1995, which is a continuation of application No. 08/111,230, Aug. 24, 1993, abandoned, which is a continuation of application No. 07/904,234, Jun. 25, 1992, abandoned.

[51] Int. Cl.$^6$ .................................................. F16D 31/00
[52] U.S. Cl. .............................................. 60/325; 60/398
[58] Field of Search ........................... 60/371, 398, 408, 60/532, 325; 290/4 R, 4 D, 4 C, 1 R, 1 D

[56] References Cited

U.S. PATENT DOCUMENTS

| | | | |
|---|---|---|---|
| 2,539,862 | 1/1951 | Rushing | 60/405 X |
| 2,861,195 | 11/1958 | Salzer | 290/4 D |
| 3,151,250 | 9/1964 | Carlson | 290/52 |
| 3,523,192 | 8/1970 | Lang | 290/52 |
| 3,631,673 | 1/1972 | Charrier et al. | 60/39.18 B |
| 3,733,095 | 5/1973 | Sinclair et al. | 290/1 R |
| 3,866,058 | 2/1975 | Lenssen | 290/52 |
| 4,079,591 | 3/1978 | Derby et al. | 290/1 R |
| 4,100,745 | 7/1978 | Gyarmathy et al. | 60/652 |
| 4,118,637 | 10/1978 | Tackett | 290/55 |
| 4,150,547 | 4/1979 | Hobson | 60/659 |
| 4,161,657 | 7/1979 | Schaffer, Jr. | 290/1 R |
| 4,173,951 | 11/1979 | Ishihara | 290/1 B |
| 4,284,900 | 8/1981 | Botts | 290/1 B |
| 4,304,103 | 12/1981 | Hamrick et al. | 60/405 X |
| 4,441,028 | 4/1984 | Lundberg | 290/52 |
| 4,447,738 | 5/1984 | Allison | 60/398 X |
| 4,872,307 | 10/1989 | Nakhamkin | 60/29.02 |
| 5,163,292 | 11/1992 | Holleyman | 60/371 X |

OTHER PUBLICATIONS

De Biasi, V.: Modified 501 Powers 10MW and 25 MW Storage Peakers, Gas Turbine World, May–Jun. 1987.
Stys, Z. S., P. A. Baerfuss, J. Lehman: Three Years of Huntdorf Operation—Soyland CAES Plant, Sep. 20–22, 1982.

*Primary Examiner*—Hoang Nguyen
*Attorney, Agent, or Firm*—Kenyon & Kenyon

[57] ABSTRACT

An energy management and supply system that uses compressed air to generate electricity. The energy system comprises one or more air compressors connected to a transmission pipeline. The transmission pipeline is adapted to store and transmit the compressed air to one or more electricity generating systems. The electricity generating systems use the compressed air to turn a turbine generator creating electricity.

8 Claims, 4 Drawing Sheets

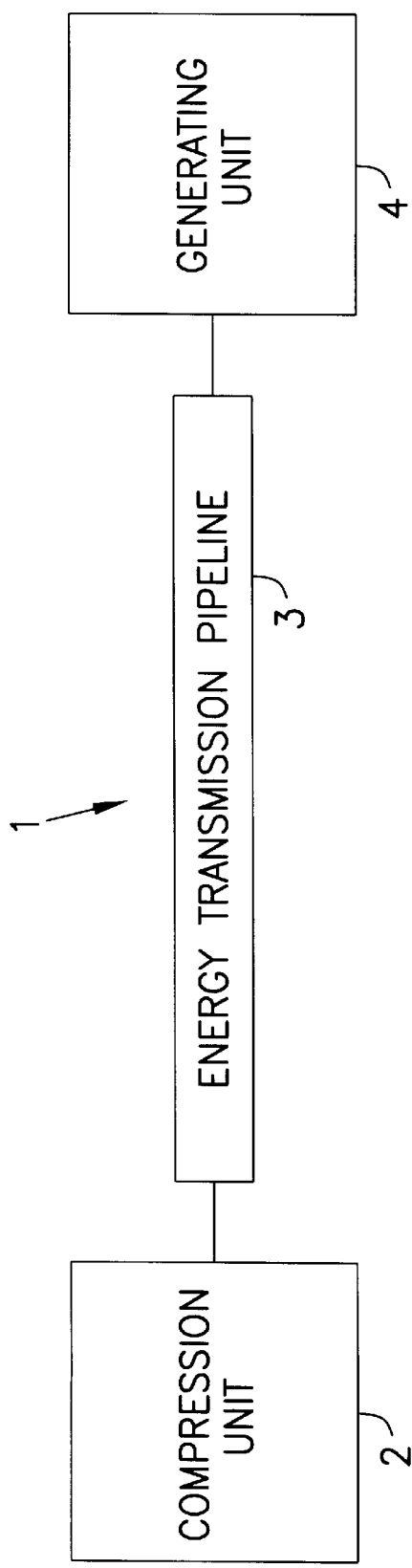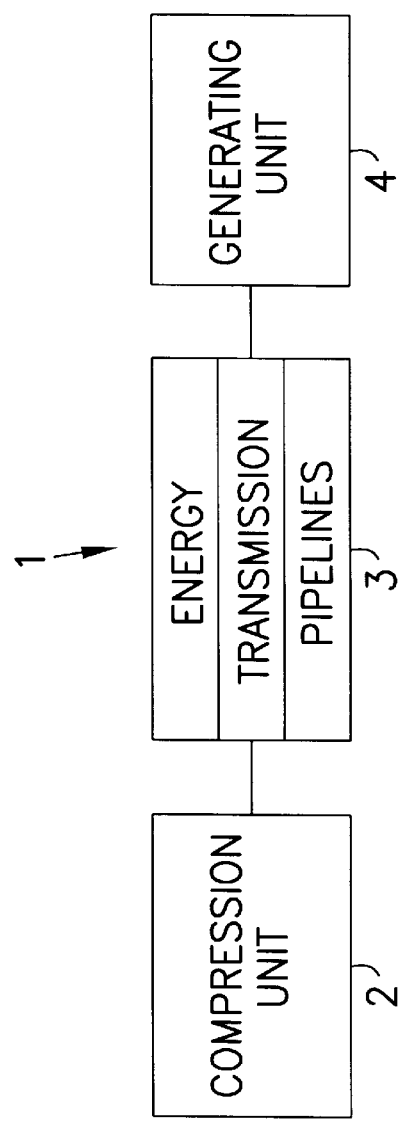

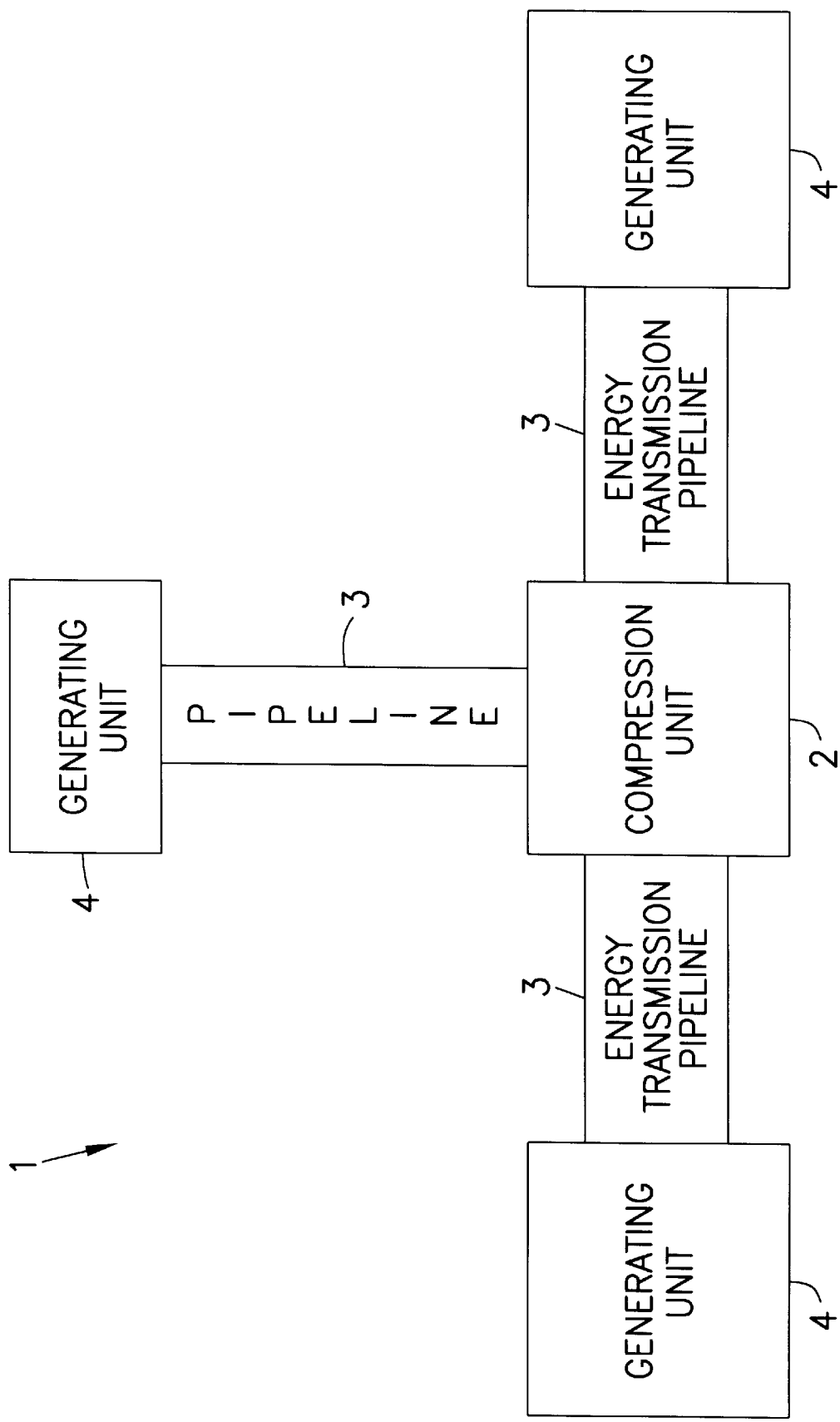

ENERGY MANAGEMENT AND SUPPLY SYSTEM AND METHOD

This application is a continuation of U.S. Ser. No. 08/699,687, filed Aug. 14, 1996, which is a continuation of application Ser. No. 08/482,694, filed on Jun. 7, 1995, which is a continuation of application Ser. No. 08/111,230, filed on Aug. 24, 1993, now abandoned, which is a continuation of parent application Ser. No. 07/904,234, filed on Jun. 25, 1992, now abandoned.

FIELD OF INVENTION

The present invention is directed to an energy system, and method and more specifically, an energy system and method that can transmit, store and manage energy to generate electrical or mechanical power.

BACKGROUND OF THE INVENTION

The utility industry is continuously searching for efficient equipment to generate, transmit and manage electrical power.

A known system for electrical power production comprises an electricity generating source that is connected to a load. The power source is often a steam generating, coal fired or nuclear power plant. The steam is used to turn a turbine generator and the electricity produced is typically transmitted to a load via electrical transmission lines.

Since the source of energy that produces electricity is often remotely located, for example, fire burning coal, nuclear plants, etc., from the demand, for example, cities and factories, the electrical transmission lines can be hundreds of miles long. Generally, the longer the transmission lines, the greater the energy losses incurred during transmission. These losses are partly due to the resistive and reactive properties of electrical transmission lines, commonly referred to as the electric transmission line impedance. In an attempt to increase transmission efficiency, utilities often attempt to match the phase angle of the voltage at the generating end with the reactance of the load. In addition, utilities must be prepared to handle electric transmission phase angle and voltage swings. These problems are often addressed by using static VAR compensators, capacitive banks, excitation equipment or synchronized generators. These devices, however, increase costs and limit the flexibility of the system by inhibiting the ability to adapt the system to various contingencies encountered during electrical transmission.

Many of the transmission losses can be alleviated by locating the electricity generating station closer to the loads. However, since loads are usually located in areas with restrictions on pollution outputs, commonly referred to as non-attainment areas, many generating stations are prohibited by law at load areas. Furthermore, the greater the distance between the energy source, for example, coal, and the generating station, the greater the decrease in the power system's efficiency due to transportation and storage costs.

Another problem associated with power systems is the ability to store energy. The demand for electricity varies each hour of the day, depending on the needs of the consumers. Demand is usually greatest during working hours with large declines in demand during the night. Power generating systems which cannot store energy must be ramped up and down in accordance with demand. This may require the addition of stand-by gas turbine plants or the purchase of energy from other utilities. Further, the need to continuously adjust the power system to the changing load requirements raises costs by increasing the electronics, mechanics and manpower necessary to run the system. In addition, this increased complexity decreases the system's reliability.

Most utility systems can generate energy at very low cost during off-peak periods. A more efficient method of producing energy would be to run a plant at a constant rate for most of the day with the energy generated during off-peak hours stored for use during other hours. This is true even if a gas turbine system is used for peak-hour production.

Utility companies have attempted several techniques at storing energy. The pumped-hydro storage method pumps water to an uphill storage facility during off-peak hours and then uses the water to produce electricity during peak hours. The pumped-hydro storage method, however, requires large amounts of land and is expensive to construct.

Another method of storing energy comprises a compressed air energy storage system, also called the air storage system energy transfer. Using this method, utilities have pumped air into large underground caverns during off-peak hours and then used the compressed air to generate energy during peak hours. The compressed air energy storage system, however, requires the plant to be located near a suitable air storage cavern.

As an alternative to storing the air in underground caverns, some utilities have attempted to store the air in manufactured tanks or tubes. These attempts have generally failed since the volume of storage required has been prohibitive.

In addition to the geographic limitations of the pumped-hydro storage system and the compressed air energy system, neither system addresses the transmission line problem. In fact, since both systems must be located near a suitable geographic location, it is likely that the electrical transmission lines used to transfer the energy will be longer and less efficient. Further, strict regulations now make it difficult to construct electrical transmission lines in many areas.

SUMMARY OF THE INVENTION

The present invention is directed to an energy system and method that generates electrical power by using compressed air to turn a turbine generator. The energy system is also capable of transmitting, storing and managing energy.

Generally, the energy system of the present invention comprises three modular components. The first component is a compression system, the second component is a generation system, and the third component is an energy transmission pipeline system used to couple the compression system to the generation system.

The compression system is designed to compress air and convey the compressed air to the energy transmission pipeline system. The compression system can comprise one or more air compressors. The compressors can be driven by either mechanical or electrical power.

In an exemplary embodiment of the present invention, the energy transmission pipeline comprises a large diameter piping. The energy transmission pipeline is designed to transmit the compressed air that was produced by the compression component of the energy system to the generation system of the energy system. The energy transmission pipeline may also store the compressed air that was produced by the compression component. Depending upon the requirements of the energy system, the pipeline can be arranged in various patterns, such as in a straight line or in a grid pattern. Generally, it is beneficial to pipe air from a remote location, for example, a location close to an energy source, to a local location that is close to the load. In this case, the energy system can alleviate existing electric transmission bottlenecks, benefit from favorable environmental regulations at the energy source, and reduce fuel transportation costs.

The generating component of the energy system is a compressorless, combustion turbine. It uses the energy of the compressed air transported by the energy transmission pipeline system to turn a turbine generator. The compressed air transported by the energy transmission pipeline system can also be mixed with fuel and then oxidized to assist in the turning of the turbine generator.

Since the turbine and generator are powered by compressed air, or compressed air mixed with fuel and then oxidized, the generating component can operate at a lower and relatively more constant heat rate than a conventional combined cycle gas powered turbine. Thus, the generating component of the present invention can produce less pollution than a traditional combined cycle gas turbine and can be located in non-attainment areas.

BRIEF DESCRIPTION OF THE DRAWINGS

FIG. 1 is a block diagram of an energy system according to an exemplary embodiment of the present invention;

FIG. 3 is a block diagram of an energy system according to a further exemplary embodiment of the present invention;

FIG. 4 is a block diagram of an energy system according to yet another exemplary embodiment of the present invention;

DETAILED DESCRIPTION

Figure 2:
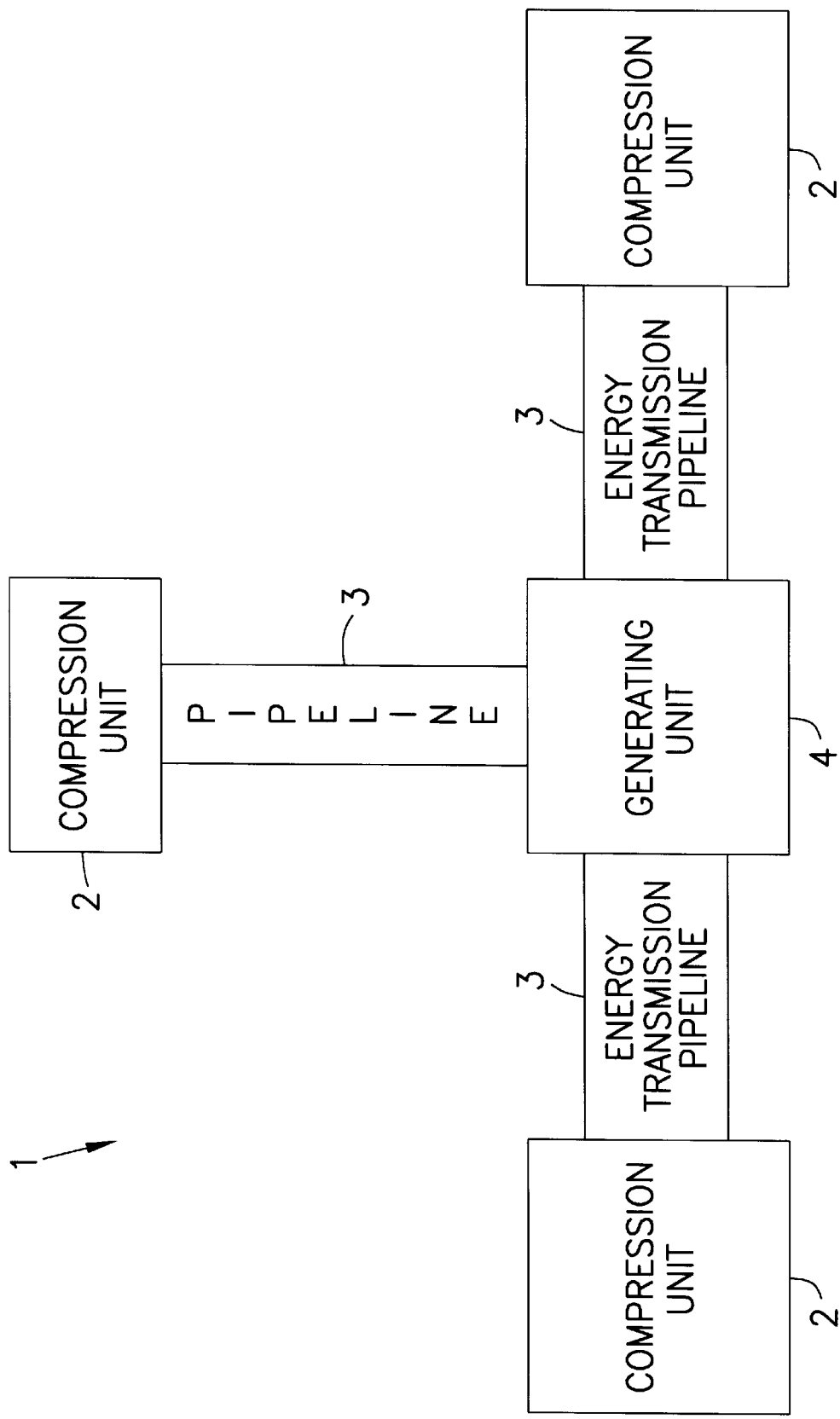
FIG. 2 is a block diagram of an energy system according to another exemplary embodiment of the present invention.

Referring now to the drawings, and initially FIG. 1, there is illustrated an energy system 1 according to an exemplary embodiment of the present invention. The energy system 1 of the present invention generates electrical power by using compressed air to turn a turbine generator.

A compression unit 2 is illustrated and is adapted to compress air and input the compressed air to an energy transmission pipeline system 3. The compressed air is transmitted to an electrical generating unit 4 via the energy transmission pipeline system 3. The compressed air may also be stored in the energy transmission pipeline system 3.

The compression unit 2 can comprise one or more air compressors. The compressors can be driven by either mechanical or electrical power. The mechanical power can be supplied by a steam turbine driven by a coal fired or nuclear boiler, or other mechanical power. The electrical power can be supplied by a generator or can be supplied from a neighboring utility. Since the compressed air can be stored in the energy transmission pipeline 3, it may be beneficial to produce a portion of the compressed air during off-peak periods when the cost of electricity is relatively low, and then use all or a portion of the stored compressed air to create electricity by the generation unit 4 during peak periods.

To vary efficiency and throughput of the energy system 1, the compressors may be located at strategic positions along the energy transmission pipeline system 3. In order to increase the efficiency of the energy system 1, some compressors may be placed close to a source of energy, such as close to a coal mine or nuclear fired utility. Placing compressors closer to an energy source increases the economic benefit of the energy system 1 due to savings in fuel transportation and storage costs, and may take advantage of favorable environmental regulations. On the other hand, placing compressors closer to the generating unit 4 of the energy system 1 allows for operating flexibility. In this case, the user can rapidly control the air pressure near the generating unit 4 which allows for continuous, reliable and efficient operation. In addition, placing compressors at positions along the pipeline or at the generating end lowers the air pressure necessary to run the energy system 1, increases throughput, and may reduce the length of energy transmission pipeline 3 necessary to run the energy system 1.

The energy transmission pipeline 3 of the exemplary embodiment of the present invention comprises large diameter, thick-walled piping. The energy transmission pipeline 3 is adapted to transmit the compressed air that was produced by the compression unit 2 of the energy system 1. In addition, the energy transmission pipeline 3 may be adapted to store the compressed air that was produced by the compression unit 2 of the energy system 1. Accordingly, the compressed air can be generated in one location and then transmitted to a remote location by the energy transmission pipeline 3 where it can be converted to electricity by the generation unit 4. In addition, the energy transmission pipeline 3 may be adapted to store the compressed air so that it can be used during peak load periods or for additional power generation. Since the energy system 1 can supply the stored air on demand, there is no need to connect or "ramp up" additional power generating equipment to produce the additional power. This increases the efficiency and reliability of the energy system 1.

Depending upon the requirements of the energy system 1, the energy transmission pipeline 3 can be arranged in various patterns, such as in straight lines or in a grid pattern. Generally, it is beneficial to pipe air from a remote location, such as a location close to an energy source, to a local location that is close to the load. In this case, the energy system 1 can alleviate existing electric transmission bottlenecks, benefit from favorable environmental regulations at the energy source while generating electricity from air and gas at the load, and benefit economically by reducing fuel transportation costs.

The generating unit 4 of the energy system 1 can comprise one or more compressorless, combustion turbines. The generating unit 4 uses the energy of the compressed air transported by the energy transmission pipeline 3 to turn a turbine generator. The compressed air can be mixed with fuel and then oxidized to assist in turning the turbine generator.

Since the generating unit 4 is powered by compressed air, or compressed air mixed with fuel and then oxidized, the generating unit 4 can operate at a lower and relatively more constant heat rate than a conventional combined cycle gas powered turbine. Thus, the generating component of the present invention can produce less pollution than a conventional combined cycle gas turbine and can be located in non-attainment areas. Accordingly, the energy system 1 can be used to efficiently supply electrical energy to locations with strict environmental regulations or regulations prohibiting the construction of electrical power transmission lines.

As noted above, the locations of the air compressors of the compression unit 2 along the energy transmission pipeline 3 can be varied to increase efficiency and to satisfy the needs of each particular customer. In addition, compression units 2, energy transmission pipeline systems 3 and generation units 4 can be efficiently added and eliminated to satisfy the changing requirements of consumers.

Referring to FIG. 2, another implementation of an exemplary embodiment of the energy system 1 of the present invention is illustrated. Multiple energy transmission pipelines 3 are illustrated connecting multiple compression units 2 to a generation unit 4. The use of separate, remote compression units 2 allows for the use of separate energy sources. The use of multiple compression units 2 also increases the reliability of the energy system 1 and provides for greater manageability of the energy system 1 because the air pressure and air volume in the energy transmission pipeline 3 can be easily regulated.

Referring to FIG. 3 another implementation of an exemplary embodiment of the energy system 1 of the present invention is illustrated. Multiple energy transmission pipelines 3 are illustrated connecting a compression unit 2 to multiple generation units 4. The use of multiple generation units 4 may be necessary to satisfy the needs of new customers in remote locations. These generation units 4 can be added to the energy system 1 as necessary. Thus, the energy system 1 can be easily modified to satisfy changing requirements. Of course, additional compressor units 2 could be added to various locations on any or all of the energy transmission pipelines 3 to increase reliability and manageability of the system.

Referring to FIG. 4 another implementation of an exemplary embodiment of the energy system 1 of the present invention is illustrated. Energy transmission pipelines 3 are illustrated connecting compression unit 2 to a generation unit 4. The use of additional energy transmission pipelines 3 shortens the distance between the compression unit 2 and the generation unit 4. Of course, placing additional compression units 2 along the energy transmission pipeline 3 would also shorten the distance between the compression unit 2 and the generation unit 4, and also shorten the length of the energy transmission pipeline 3 necessary to store and transmit the compressed air. Of course, additional energy transmission pipelines 3, as well as additional compression units 2, could be added to the energy system 1 to connect additional generation units 4 to the existing energy transmission pipeline 3. Thus, the energy system 1 can be readily adapted to the changing requirements of consumers.

Figure 5:
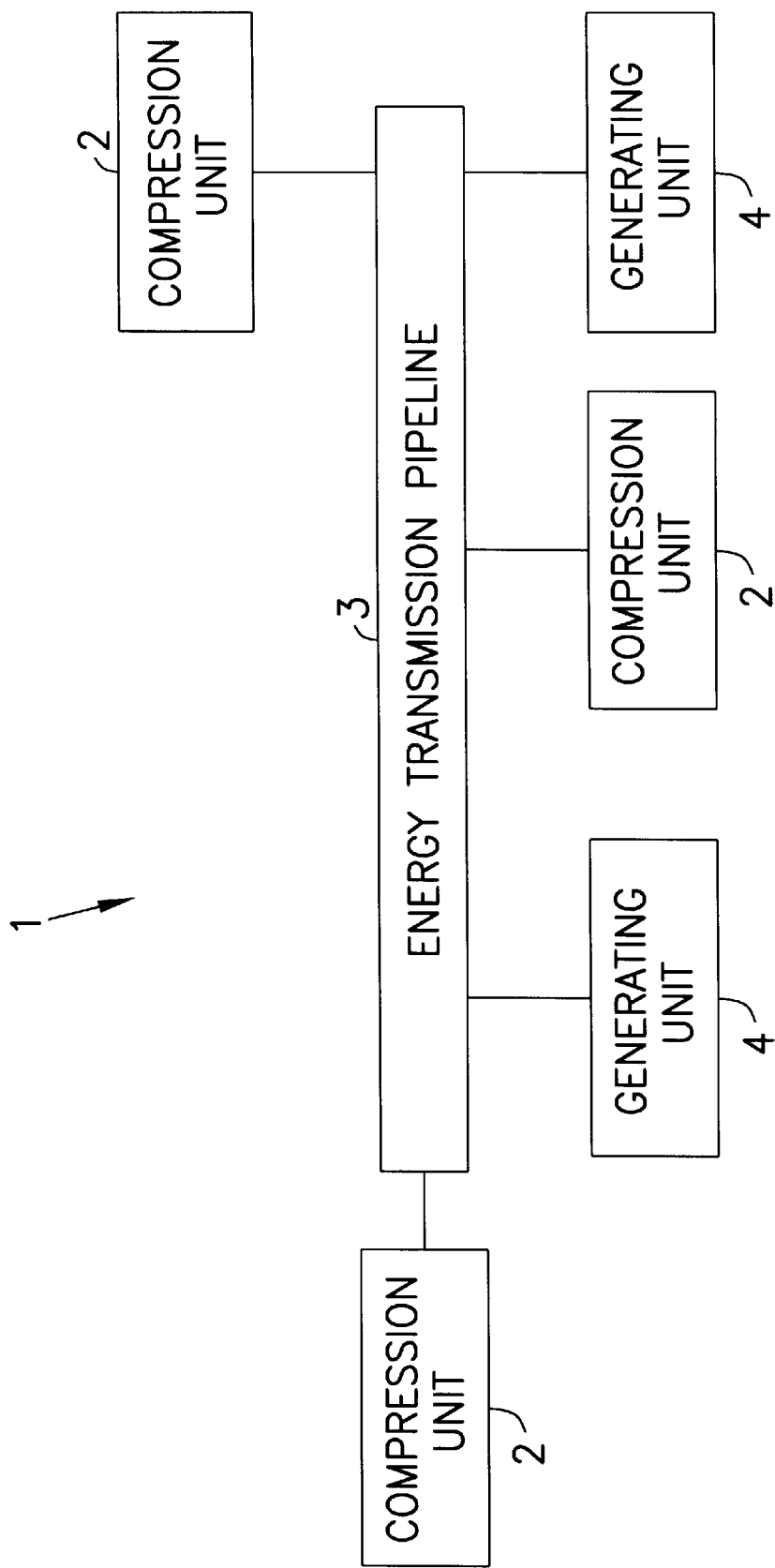
FIG. 5 is a block diagram of an energy system according to an additional exemplary embodiment of the present invention.

Referring to FIG. 5 another implementation of an exemplary embodiment of the energy system 1 of the present invention is illustrated. An energy transmission pipeline 3 is illustrated connecting multiple compression units 2 to multiple generation units 4. The use of additional compression units 2 shortens the length of the energy transmission pipelines 3 necessary and allows the air pressure and air volume in the energy transmission pipeline 3 to be easily managed. Additional generation units 4 can be added at various locations on the energy transmission pipeline 3 to satisfy the needs of a customer. Of course, additional energy transmission pipeline 3 can be connected to the energy system 1 to create additional air storage, or to connect additional compression units 2 or generation units 4 to the existing energy transmission pipeline 3. Accordingly, the energy system 1 can be readily adapted and modified to satisfy changing requirements of consumers.

What is claimed is:

1. An electrical power generation and transmission system for transporting electricity into a load area, comprising:

a plurality of electrical transmission lines extending into a load area from a power source located geographically remote from the load area to transmit a first portion of power from the sower source to the load area in the form of electric power;

a first air compressor which utilizes a second portion of the power from the power source to generate compressed air;

a first pipeline for storing compressed air and for transporting the compressed air from a proximal end of the first pipeline at the power source to a distal end of the pipeline located in the load area;

a turbine generator connected to the distal end of the first pipeline in the load area for generating electrical energy from the compressed air in the first pipeline;

a second pipeline for transporting and storing compressed air, the second pipeline extending from an inlet in the load area to an outlet coupled to the turbine generator;

a second air compressor located in the load area coupled to the inlet of the second pipeline for generating compressed air, wherein the second air compressor is driven by electric power;

wherein the second air compressor is controlled so that, during the occurrence of a predetermined contingency, the second air compressor is shut down to eliminate its electric load so that additional electricity is available in the load area during the occurrence of the contingency.

2. The electrical power generation and transmission system according to claim 1, wherein the outlet of the second pipeline is also operably connected to the first pipeline for transmitting compressed air from the second pipeline to the first pipeline.

3. An electrical power generation and transmission system for transporting electricity into a load area comprising:

a plurality of electrical transmission lines extending into a load area from a power source located geographically remote from the load area to transmit a first portion of the power from the power source to the load area in the form of electric power:

a first air compressor which utilizes a second portion of the power from the power source to generate compressed air;

a first pipeline for transporting and storing compressed air, the first pipeline extending from a proximal end at the power source to a distal end located in the load area;

a turbine generator operably connected to the distal end of the first pipeline in the load area for generating, from the compressed air in the first pipeline, an additional amount of electrical energy to be supplied to the load area;

a second air compressor located in the load area for generating compressed air, wherein the second air compressor is driven by electric power;

a second pipeline for transporting and storing compressed air, wherein the second pipeline extends from an inlet coupled to the second air compressor to an outlet operably connected to the first pipeline for transmitting compressed air from the second pipeline to the first pipeline;

wherein, during the occurrence of a predetermined contingency, the second air compressor is shut down to eliminate its electric load so that additional electricity is available in the load area.

4. A method of supplying electricity from a power source geographically remote from a load area, to the load area, comprising the steps of:

transmitting a first portion of power from the power source to the load area in the form of electrical energy via a plurality of electrical transmission lines;

utilizing a second portion of power from the power source to operate a first air compressor located adjacent to the power source to generate a first portion of compressed air;

supplying the first portion of compressed air to a first pipeline via an inlet of the first pipeline which is coupled to the first air compressor;

transmitting the first portion of compressed air to the load area via the first pipeline;

generating electricity in the load area by combusting the first portion of compressed air with fuel to drive a turbine generator;

electrically driving a second air compressor located in the load area to generate a second portion of compressed air;

supplying the second portion of compressed air to a second pipeline;

combusting the second portion of compressed air with fuel to drive the turbine generator to generate electricity in the load area;

shutting down the second air compressor when additional electricity is needed in the load area.

5. The method according to claim 4, further comprising the step of: combining the first portion of compressed air with the second portion of compressed air.

6. An electrical power generation and transmission system for transporting electricity into a load area, comprising:

a plurality of electrical transmission lines extending into a load area from a power source located geographically remote from the load area to transmit a first portion of power from the power source to the load area in the form of electric power;

a first air compressor which utilizes a second portion of the power from the power source to generate compressed air;

a first pipeline for storing compressed air and for transporting the compressed air from a proximal end of the first pipeline at the power source to a distal end of the pipeline located in the load area;

a turbine generator connected to the distal end of the first pipeline in the load area for generating electrical energy from the compressed air in the first pipeline;

a second pipeline for transporting and storing compressed air, the second pipeline extending from an inlet in the load area to an outlet coupled to the turbine generator; and a second air compressor located in the load area coupled to the inlet of the second pipeline for generating compressed air, wherein the second air compressor is driven by electric power.

7. An electrical power generation and transmission system for transporting electricity into a load area comprising:

a plurality of electrical transmission lines extending into a load area from a power source located geographically remote from the load area to transmit a first portion of the power from the power source to the load area in the form of electric power;

a first air compressor which utilizes a second portion of the power from the power source to generate compressed air;

a first pipeline for transporting and storing compressed air, the first pipeline extending from a proximal end at the power source to a distal end located in the load area;

a turbine generator operably connected to the distal end of the first pipeline in the load area for generating, from the compressed air in the first pipeline, an additional amount of electrical energy to be supplied to the load area;

a second air compressor located in the load area for generating compressed air, wherein the second air compressor is driven by electric power;

a second pipeline for transporting and storing compressed air, wherein the second pipeline extends from an inlet coupled to the second air compressor to an outlet operably connected to the first pipeline for transmitting compressed air from the second pipeline to the first pipeline.

8. A method of supplying electricity from a power source geographically remote from a load area to the load area, comprising the steps of;

transmitting a first portion of power from the power source to the load area in the form of electrical energy via a plurality of electrical transmission lines;

utilizing a second portion of power from the power source to operate a first air compressor located adjacent to the power source to generate a first portion of compressed air;

supplying the first portion of compressed air to a first pipeline via an inlet of the first pipeline which is coupled to the first air compressor;

transmitting the first portion of compressed air to the load area via the first pipeline;

generating electricity in the load area by combusting the first portion of compressed air with fuel to drive a turbine generator;

electrically driving a second air compressor located in the load area to generate a second portion of compressed air;

supplying the second portion of compressed air to a second pipeline; and combusting the second portion of compressed air with fuel to drive the turbine generator to generate electricity in the load area.

* * * * *